US010676399B2

(12) United States Patent
Capobianco et al.

(10) Patent No.: US 10,676,399 B2
(45) Date of Patent: Jun. 9, 2020

(54) SYSTEMS AND METHODS FOR ADDITIVE MANUFACTURING USING CERAMIC MATERIALS (71) Applicant: Applied Cavitation, Inc., Goleta, CA (US)

(72) Inventors: Joseph Albert Capobianco, Marlton, NJ (US); Dana Lynn Hankey, Santa Barbara, CA (US); Marshall Campion Tibbetts, Goleta, CA (US); Timothy Fahey, Akron, OH (US)

(73) Assignee: Applied Cavitation, Inc., Goleta, CA (US)

( * ) Notice: Subject to any disclaimer, the term of this patent is extended or adjusted under 35 U.S.C. 154(b) by 617 days.

(21) Appl. No.: 15/322,047

(22) PCT Filed: Jun. 23, 2015

(86) PCT No.: PCT/US2015/037114
§ 371 (c)(1),
(2) Date: Dec. 23, 2016

(87) PCT Pub. No.: WO2015/200280
PCT Pub. Date: Dec. 30, 2015

(65) Prior Publication Data
US 2017/0137327 A1 May 18, 2017

Related U.S. Application Data (60) Provisional application No. 62/015,628, filed on Jun. 23, 2014.

(51) Int. Cl.
C04B 35/622 (2006.01)
C04B 35/628 (2006.01)
(Continued)

(52) U.S. Cl.
CPC ........ *C04B 35/62218* (2013.01); *B28B 1/001* (2013.01); *B29C 64/153* (2017.08);
(Continued)

(58) Field of Classification Search
CPC ...................................... B28B 1/001
See application file for complete search history.

(56) References Cited

U.S. PATENT DOCUMENTS

2005/0143253 A1* 6/2005 Na .................. B02C 17/16
501/103
2006/0157454 A1 7/2006 Larsson
(Continued)

FOREIGN PATENT DOCUMENTS

WO WO 03-090937 11/2003

OTHER PUBLICATIONS

Baldyga et al. Deagglomeration processes in high-shear devices. Chemical Engineering Research and Design 86 (2008) pp. 1369-1381. (Year: 2008).*
(Continued)

*Primary Examiner* — Erin Snelting
(74) *Attorney, Agent, or Firm* — Foley & Lardner LLP (57) ABSTRACT Provided in one implementation is a method of manufacturing a three-dimensional object. The method can include depositing a substantially uniform layer of raw material onto a substrate. The raw material can include ceramic particles. The method can include selectively fusing particles of the raw material to form a first layer of the object. The method can include clearing non-fused particles of the raw material from the first layer of the object. The method can include repeating the steps of depositing a raw material, selectively fusing particles of the raw material, and clearing non-fused particles of the raw material to form additional layers of the object above the first layer.

11 Claims, 8 Drawing Sheets (51) Int. Cl.
  *B28B 1/00* (2006.01)
  *C04B 35/626* (2006.01)
  *C04B 35/63* (2006.01)
  *C04B 35/64* (2006.01)
  *B33Y 70/00* (2020.01)
  *C04B 35/111* (2006.01)
  *C04B 35/486* (2006.01)
  *B29C 64/153* (2017.01)
  *B33Y 10/00* (2015.01)

(52) U.S. Cl.
  CPC .............. *B33Y 10/00* (2014.12); *B33Y 70/00* (2014.12); *C04B 35/111* (2013.01); *C04B 35/486* (2013.01); *C04B 35/6264* (2013.01); *C04B 35/62802* (2013.01); *C04B 35/62842* (2013.01); *C04B 35/63* (2013.01); *C04B 35/64* (2013.01); *C04B 2235/604* (2013.01); *C04B 2235/6026* (2013.01); *C04B 2235/661* (2013.01); *C04B 2235/665* (2013.01); *C04B 2235/666* (2013.01); *C04B 2235/667* (2013.01); *C04B 2235/94* (2013.01)

(56) References Cited

U.S. PATENT DOCUMENTS

| 2007/0183918 | A1* | 8/2007 | Monsheimer | B28B 1/001 419/1 |
| 2008/0036117 | A1 | 2/2008 | Hickerson | |
| 2010/0101490 | A1 | 4/2010 | Bokodi | |
| 2013/0015609 | A1 | 1/2013 | Landau | |
| 2014/0314964 | A1* | 10/2014 | Ackelid | B05D 3/068 427/496 |

OTHER PUBLICATIONS

International Search Report of PCT/US2015/037114 dated Sep. 25, 2015.
Written Opinion of the International Searching Authority of PCT/US2015/037114 dated Sep. 25, 2015.
Non-Final Office Action on U.S. Appl. No. 15/322,047 dated Sep. 17, 2019.

* cited by examiner

SYSTEMS AND METHODS FOR ADDITIVE MANUFACTURING USING CERAMIC MATERIALS

RELATED APPLICATIONS

This application is a U.S. National Stage of International Application No. PCT/US2015/037114, titled "SYSTEMS AND METHODS FOR ADDITIVE MANUFACTURING USING CERAMIC MATERIALS" filed on Jun. 13, 2015, which in turn claims priority to U.S. Patent Provisional Patent Application No. 62/015,628, titled "PROCESS FOR ADDITIVE MANUFACTURING CAPABLE OF PRODUCING FUNCTIONAL DEVICES COMPOSED OF MATERIALS WITH HIGH MELTING POINTS" filed on Jun. 23, 2014, contents of all of which are incorporated herein.

BACKGROUND

Ceramics have material properties that make them useful for incorporation into many different devices. For example, ceramics are harder and stiffer than metals and polymers, more heat and corrosion resistant than metals or polymers, less dense than most metals and their alloys, and ceramic raw materials are both plentiful and inexpensive. However, when ceramics are used in traditional additive manufacturing processes, post processing is typically required to fuse or sinter the ceramic particles.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of manufacturing a three-dimensional object from a raw material including ceramic particles without requiring post process sintering. The method can include depositing a substantially uniform layer of raw material onto a substrate, wherein the raw material comprises ceramic particles having a substantially uniform size. The raw material can include ceramic particles. The method can include selectively fusing particles of the raw material to form a first layer of the object. The method can include clearing non-fused particles of the raw material from the first layer of the object. The method can include repeating the steps of depositing a raw material, selectively fusing particles of the raw material, and clearing non-fused particles of the raw material to form additional layers of the object above the first layer.

Another innovative aspect of the subject matter described in this disclosure can be implemented in a method of manufacturing a three-dimensional object from a raw material including ceramic particles without requiring post process sintering. The method can include depositing a layer of raw material onto a substrate. The raw material can include ceramic particles and can be patterned across a surface of the raw material. The pattern can define a sintering region corresponding to a shape of a first layer of the object and a non-sintering region surrounding the sintering region. Ceramic particles within the sintering region can have a substantially uniform size The method can include applying a sintering process to the layer of raw material to fuse particles of the raw material within the sintering region to form the first layer of the object. The method can include clearing non-fused particles of the raw material from the first layer of the object. The method can include repeating the steps of depositing a patterned layer of raw material, applying a sintering process to the raw material, and clearing non-fused particles of the raw material to form additional layers of the object above the first layer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and implementations of, systems and methods for additive manufacturing using ceramic materials. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Cavitation

Cavitation may refer to the formation of vapor cavities in a liquid (e.g., small liquid-free zones such as "bubbles" or "voids") that are formed as a result of forces acting upon the liquid. The process generally may occur when a liquid is subjected to rapid changes of pressure that cause the formation of cavities where the pressure is relatively low. When subjected to higher pressure, the voids may implode and may generate an intense shockwave. Depending on the application, any suitable mode of cavitation may be employed in the methods and systems provided herein. For example, the cavitation process in one implementation may involve, or be, hydrodynamic cavitation.

Hydrodynamic cavitation may refer to a process of vaporization, bubble generation, and bubble implosion, which occurs in a flowing liquid as a result of a decrease and subsequent increase in pressure. Hydrodynamic cavitation may be produced by passing a liquid through a constricted channel at a specific velocity or by mechanical rotation of an object through a liquid. In the case of the constricted channel and based on the specific (or unique) geometry of the system, the combination of pressure and kinetic energy may create the hydrodynamic cavitation cavern downstream of the local constriction generating high energy cavitation bubbles.

Orifices and venturi tubes may be used for generating cavitation. A venturi tube may be employed because of its smooth converging and diverging sections, such that that it may generate a higher velocity at the throat for a given pressure drop across it. On the other hand, an orifice may accommodate more numbers of holes (larger perimeter of holes) in a given cross sectional area of the pipe. Both options are possible.

Some of the pre-existing cavitation systems utilize opposing water jets to create the pressure needed for cavitation to occur while others create the pressure and resulting vacuum by having hydraulic pumps driving and oscillating plungers which draw the low viscosity materials in and then pushes the low viscosity material through the specific point where cavitation occurs. However, none of these pre-existing systems is equipped to handle a raw material that has a viscosity larger than that of a fluid, to disperse the constituents, or to attain the desired particle size distribution through de-agglomeration.

Additive Manufacturing

Additive manufacturing, also referred to as three dimensional (3D) printing, is a process for constructing three-dimensional solid objects from a digital model. The process is considered additive manufacturing because the product is constructed through successive layer depositions to its final shape. Subtractive processes such as traditional machining, cutting, drilling, grinding typically are not utilized. Generally, additive manufacturing is subdivided into three techniques: stereolithography, fused filament fabrication, and selective laser sintering. Each of these techniques can make use of a different type of raw material. This disclosure is primarily directed to selective laser sintering and related processes.

Stereolithography is an additive manufacturing process which employs a liquid raw material to produce a product. Specifically, a vat of liquid ultraviolet curable photopolymer resin and an ultraviolet laser are used to build sequential layers of the product. For each layer, the laser beam traces a cross-section of the part pattern on the surface of the liquid resin. Exposure to the ultraviolet laser light cures and solidifies the pattern traced on the resin and joins it to the layer below. The first layer can be supported on an elevator platform within the vat of liquid.

After the pattern has been traced, the elevator platform descends by a distance equal to the thickness of a single layer, which can be in the range of about 0.05 millimeters to 0.15 millimeters. Then, a resin-filled blade can sweep across the cross-section of the part to coat it with fresh material. On this new liquid surface, the subsequent layer pattern is traced by the laser, thereby joining the layer to the previous layer. These steps can be repeated until the complete product is formed.

In fused filament fabrication, the product or part is produced by extruding small beads of thermoplastic polymers (or thermoplastic polymer composites) from a nozzle. A filament of raw material is unwound from a coil and supplies the raw material to an extrusion nozzle at a controlled rate. The nozzle can be heated to soften the raw material of the filament as it is extruded. The nozzle can be moved in both horizontal and vertical directions by a numerically controlled mechanism. The nozzle follows a tool-path controlled by a computer-aided manufacturing software package, and the part is built from the bottom up, one layer at a time.

Selective laser sintering works similarly to stereolithography, with key distinct differences. First, instead of liquid photopolymer in a vat, the raw material used for selective laser sintering is a bed layer containing powdered materials, such as polystyrene, ceramics, glass, nylon, and metals including steel, titanium, aluminum, and silver. The bed preheats the powders to a specified temperature while a high power laser is rastered across the surface to selectively fuse small particles of plastic, metal, ceramic, or glass powders into a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by a distance equal to the thickness of one layer, a new layer of raw material is applied on top, and the process is repeated until the part is completed. When the laser hits the powder, the powder is fused at that point, for example by sintering. All unsintered powder remains as is, and can become a support structure for the object.

The raw materials (i.e., inks, pastes, filaments, etc.) can be improved by effectively breaking up agglomerates to reduce the average particle size of the raw material. Furthermore, effectively dispersing the functional filler materials within the raw materials can result in more uniform raw materials. As described below, a hydrodynamic cavitation process can be used to produce raw materials for additive manufacturing having small average particle sizes and complete dispersion.

Cavitation Equipment

Figure 1:
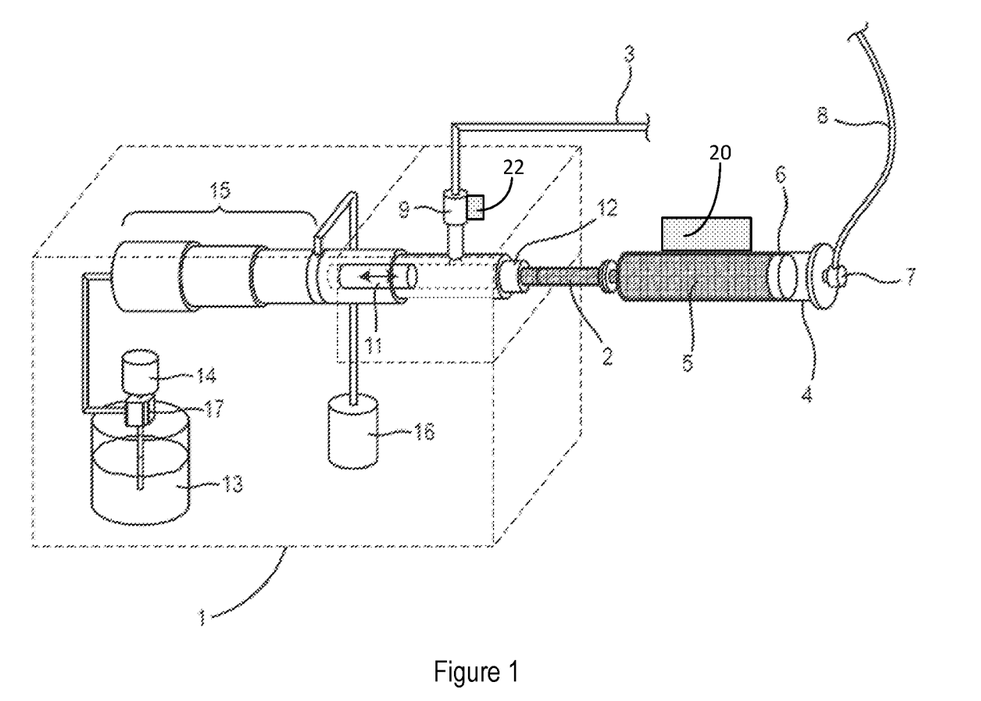
FIG. 1 provides a schematic of an example cavitation or emulsifying machine, according to an illustrative implementation.

Depending on the application, any suitable equipment capable of carrying out a cavitation or an emulsifying process may be employed to produce materials for additive manufacturing. FIG. 1 provides a schematic of an example cavitation or emulsifying machine 1, according to an illustrative implementation. The machine comprises an inlet 2 and an outlet 3. The machine 1 may be a commercially available cavitation machine or may be a custom-designed cavitation machine. For example, in some implementations, the cavitation machine 1 may be a DeBEE 2000 cavitation machine produced by BEE International or an M-110P cavitation machine produced by Microfluidics. The apparatus system provided herein configured to feed the raw material into the base cavitation machine 1 may refer to the system that is attached to the base cavitation machine 1, such as at the inlet 2 thereof. Alternatively, the apparatus system provided herein may refer to a fabrication system comprising a combination of both the base cavitation machine 1 and the attached system, as shown in FIG. 1.

Referring to FIG. 1, the apparatus system may comprise at least one feed tube 4, a raw material 5 inside the feed tube 4, and a piston 6 that pushes the material down the feed tube 4, forcing it into the inlet 2 of the machine 1. The apparatus system may also comprise an air valve 7 on the back end of the feed tube 4, which air valve 7 controls the flow of compressed air into the feed tube 4. The apparatus system may comprise an air line 8, which feeds compressed air into the air valve 7 and into the feed tube 4 from a source of compressed air.

The base cavitation machine 1 may include any suitable components, depending on the application. For example, the base cavitation machine may include two hydraulic pumps which are utilized to push the paste through a very small orifice, into a very small vacuum chamber, and out another very small orifice that creates a specific desired back pressure. In one implementation, this combination of small orifices with a vacuum chamber in the middle is where the hydrodynamic cavitation occurs. In some implementations, the cavitation machine may include other components configured to introduce raw material through the very small orifice. For example, the cavitation machine may include components configured to inject or push the raw material through the very small orifice without the use of hydraulic pumps or pistons.

The base cavitation machine 1 also includes a hydraulic reservoir 13, a motor 14, which runs a pump 17, to pump the hydraulic oil up to an intensifier 15, which drives the oscillating plunger 11 that pushes the material up into the cavitation chamber 9, while the ball check system 12 closes to allow the material to be forced into the cavitation chamber 9, where the orifices are housed and the cavitation takes place. As the intensifier 15 pushes the plunger 11 forward, hydraulic oil in the front of the intensifier 15 is pushed against a nitrogen bag 16. After the plunger 11 in a fully actuated position, a positioning sensor stops the hydraulic pump 17 from driving the intensifier 15, and the pressure accumulates against the nitrogen bag 16, causing the plunger 11 to be pushed back to its starting position.

Depending on the application, the setups, including the number of feed tubes, may be varied. In one implementation, a small single feed tube containing the raw material may be employed for small batches that may be tested after each pass through the cavitation machine. The cavitation machine 1 also can include a first heating element 20 configured to apply heat to the feed tube 4 and a second heating element 22 configured to apply heat to the cavitation chamber 9. In some implementations that the cavitation machine 1 may include only the first heating element 20. In other implementations, the cavitation machine 1 may include only the second heating element 22. In other implementations, the cavitation machine 1 may include both the first heating element 20 and the second heating element 22. In some implementations, the first heating element 20 and the second heating element 22 can be resistive heaters or heating wraps that are positioned on the feed tube 4 and the cavitation chamber 9, respectively. The heating elements 20 and 22 can be configured to bring the temperature of the raw material within the cavitation machine 1 within the range of about zero degrees Celsius to about 700 degrees Celsius. In some implementations, the heating elements can be configured to bring the raw material to a temperature in the range of about 50 degrees Celsius to about 100 degrees Celsius above its glass transition temperature.

In other implementations, other types of heating elements may be used. For example, focused radiant energy (e.g., microwave, infrared, radio wave, etc.) can be used to implement the first heating element 20 and the second heating element 22. In other implementations, the heating elements 20 and 22 can be formed from immersion type systems, in which the portions to be heated are enclosed in a chamber such as a furnace to prepare a "water jacket." The chamber can contain a solid, liquid or gas which conforms to the shape of the sections of the cavitation machine 1 to be heated. In some implementations, using a secondary material can facilitate more precise temperature control, because the temperature can remain substantially constant during a phase transition, such as melting or boiling. In some implementations, the chamber can also have a "Russian doll" configuration where an outer chamber such as a furnace encloses a smaller chamber, which contains the solid, liquid or gas medium surrounding the heated section of the cavitation system. Common gasses used in such a system can include, air, nitrogen, noble gasses, steam, etc. Common liquids can include water, solvents with relatively high boiling points, or molten materials such as plastic or metal. In some implementations, solid materials such as thermally conductive powders can be used to conform to the shape of the cavitation machine 1 without melting. In still other implementations, the chamber can be heated using gas and/or electric heating elements. The heat can be transmitted from the furnace to the surrounding solid, liquid or gas via convection, conduction and/or radiation. Likewise, the heat will be transmitted to the cavitation machine via these mechanisms.

In some implementations, additional heating elements may be used. For example, it may be desirable to heat additional sections of the cavitation machine other than the sections that are shown in contact with the heating elements 20 and 22. Such additional heating elements also can be implemented using any of the techniques discussed above, including conventional heating jackets, printed thick film resistive heaters, or other heating techniques that make use of conduction, convection, and/or radiation.

Figure 2:
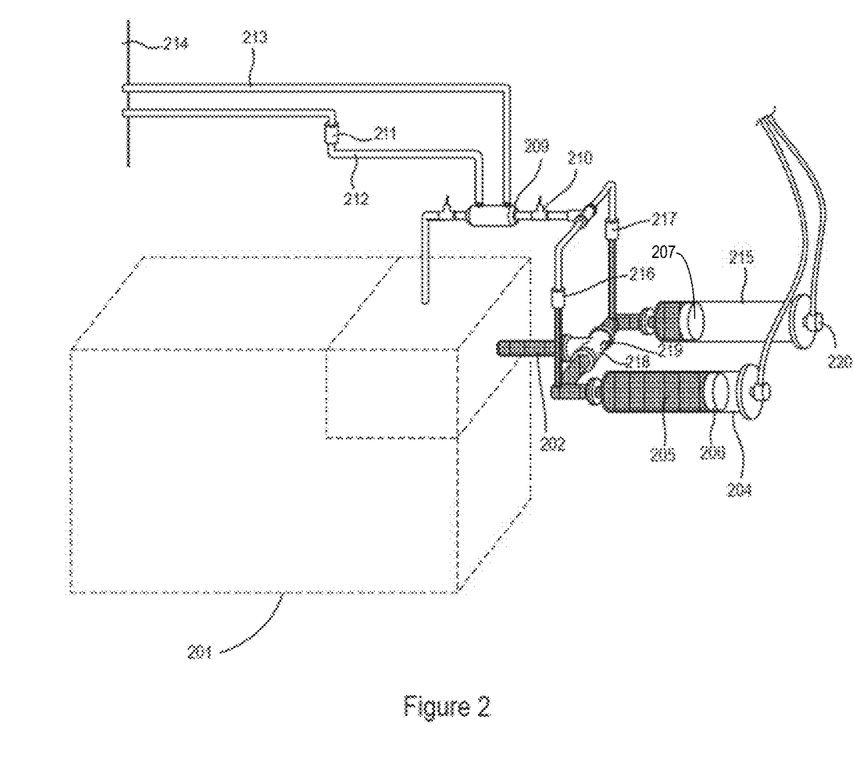
FIG. 2 provides a schematic of another example cavitation or emulsifying machine further including a thermal control system and a closed system that facilitates multiple cavitation passes, according to an illustrative implementation.

FIG. 2 provides a schematic of another example cavitation or emulsifying machine 201 further including a thermal control system and a closed system that facilitates multiple cavitation passes, according to an illustrative implementation. The thermal control system may comprise a heat exchanger 209 inline directly after the material exits the cavitation process. The heat exchanger 209 may be followed (downstream) by a thermal couple 210, which is configured to read the temperature of the material after the material has passed the heat exchanger 209. Chilled water may be applied to the heat exchanger using at least a water valve 211, which allows water to flow from a chilled water source 214 to the heat exchanger 209 via water tubing 212 through the heat exchanger 209, then out of the heat exchanger 209 and back to the return water connection of the chilled water via water tubing 213. Although not shown in FIG. 2, the thermal control system also can include heating elements positioned in contact with the tubes 204 and 215 (similar to the heating element 20 shown in FIG. 1), as well as a heating element positioned in contact with the cavitation chamber.

The flow of the water may be controlled manually or automatically, such as by a software program. In one implementation, a predetermined temperature may be inputted into a software program that, when executed, causes at least one processor to execute the thermal control system. In another implementation, the feedback from the thermal couple 210 may enable the software to adjust the water valve 211 such that the temperature of the material exiting the thermal control system is within a desired range. In some implementations, the system can include additional thermal couples to measure the temperature of the material in the system at other areas. For example, additional thermal couples can be configured to measure temperatures of the material going into the three-way valve 218, the temperature of the material exiting the cavitation chamber, and the temperature of the material exiting the heat exchanger 209. Outputs from all of these thermal couples may be used to control the flow of chilled water or the application of heat using heating elements such as the heating elements 20 and 22 shown in FIG. 1. In one implementation, the material is processed in a single discrete pass. The tubes are then interchanged and the process may be repeated for as many passes as needed to achieve the desired product material properties.

Also shown in FIG. 2 is a closed system that allows and/or facilitates multiple cavitation passes. The closed system, which is further downstream from the thermal control system, may further comprise a second feed tube; a plurality of two-way valves and three-way valves configured to resupply the product material back into the hydrodynamic cavitation chamber to repeat the hydrodynamic cavitation process; and two pressure transducers. This implementation may be suitable for a larger-scale production than the smaller (e.g., R&D) implementation described above. One benefit of the closed system described herein is mitigation (such as complete elimination) of exposure to contamination (e.g., air).

The closed system comprises two-way valves 216 and 217, which control the direction of the material when it is being pushed into the system, as well as the direction the material travels after it exits the heat exchanger 209. The system may further comprise a three way valve 218, which is desirably in sync with the two-way valves 216 and 217 in order for the material to travel into the cavitation machine 201. In one implementation, when the material 205 in tube 204 is forced down the tube by the air driven piston 206, the two-way valve 216 must be closed so that the material 205 travels past that valve and to the three-way valve 218. When the material 205 is in tube 204, the three-way valve 218 allows the material 205 to travel from tube 204 into the cavitation machine 1.

After cavitation takes place, the material travels through the thermal control system and out of the heat exchanger 209, and past the thermal couple 210. At this point, the material then travels through the open two-way valve 217 and then into tube 215, pushing the air-driven piston 207 down the tube towards the back of the tube where the air valve 220 supplies air to the piston in tube 215. During this process of moving the material from tube 204 to tube 215, the air valve 220 is open so that air is able to be pushed out of tube 215 as it fills with material and the piston 207 is forced towards the back of tube 215. When tube 204 is empty, the piston 206 inside hits the front of tube 204, and there is no more pressure on the material being forced into the machine. In some implementations, the pressure within the system can be controlled to be maintained within a range of about 200 PSI to about 45,000 PSI, depending on the properties of the raw material being processed.

A pressure transducer 219, which is located near the inlet 202 of the machine by the three-way valve, may transmit this drop in pressure to a software program, which then causes at least one processor to switch the two-way valves and three-way valves so that the material will travel from tube 215 back through cavitation machine 201 and back into tube 204. Once the valves have switched (217 closed, 216 open, and 218 switched) so that material travels from tube 215 into cavitation machine 201, the air valve 220 may automatically turn on and force the piston 207 and the material down tube 215 through the entire process and back to tube 204.

An operator or user may choose the number of times the material will pass through the cavitation machine 201, thereby repeating the cavitation and/or cooling processes (by the thermal control system). In one implementation, after the pre-determined number of passes is achieved, the system, as well as the air driving the valves and pistons, may automatically shut off. This safety feature may release the air pressure once the current cycle is completed. In one implementation, the system setups described herein allow samples of the material to be taken at any time to determine if the desired results have been achieved after a certain number of passes at the desired operating pressure(s) and temperature(s).

In one implementation, the apparatus systems provided herein may control the temperature of the material by at least one of software and several thermal couples used to determine the temperature of the material at several points in the process and actuate a water valve, which controls the heating elements and as well as the flow of chilled water to the heat exchanger put inline directly after the cavitation takes place. In one implementation, the material is cooled after cavitation to reduce the temperature to a range that is suitable for the material being processed so that it remains stable and ready for the next cycle or pass. In some implementations, the thermal control system can control the heating elements and the water valve such that a thermal degradation temperature of the material is not exceeded. As discussed above, the machine 201 may be used to process various materials that can be used in additive manufacturing processes, such as pastes, powders, and filaments. In some implementations, when the machine is used to process a paste, the temperature of the raw material can be maintained in the range of about 10 degrees Celsius to about 50 degrees Celsius. For processing thermoplastics in the absence of solvent, the temperature of the raw material in the machine 201 can be controlled to be about 25 degrees Celsius to about 100 degrees Celsius above the glass transition temperature of the polymer in the raw material. In some implementations, higher temperatures may be necessary for raw materials having a greater molecular weight or raw materials including branched polymers. Thus, in some implementations, the temperature of the raw material in the machine 201 can be controlled to be within a range of about zero degrees Celsius to about 700 degrees Celsius, depending on various properties of the raw material.

Without the temperature control system shown in FIG. 2, the material in at least one implementation may retain too much heat and may gain even more heat energy though each pass, resulting in damaging some of its constituents. When the material is processed with set parameters for pressure and temperature, which may be determined for each material through trial and errors and/or parametric studies, the consistency of the product from lot to lot is surprisingly far superior to any other pre-existing process for preparing medium to high viscosity inks, pastes, slurries or dispersions of nano-particles. The ability to move medium to high viscosity materials in a continuous and controlled manner through the cavitation process by the apparatus systems and methods described herein is unexpected over the pre-existing methods.

Figure 3A:
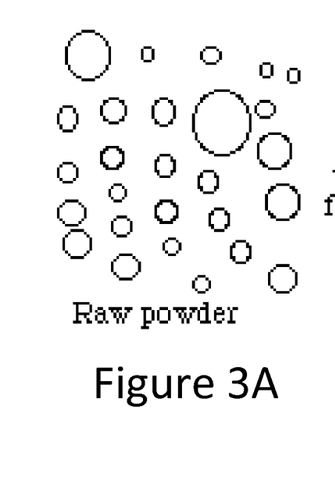
FIGS. 3A-3C illustrate the steps of forming a sintered product from a raw material, according to an illustrative implementation.
Figure 3B:
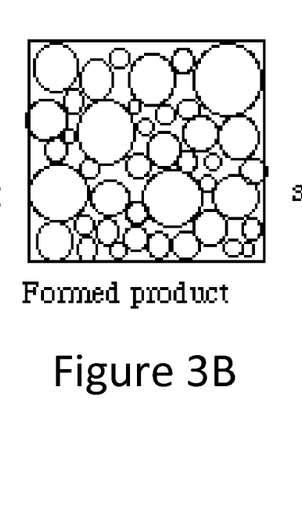
Figure 3C:
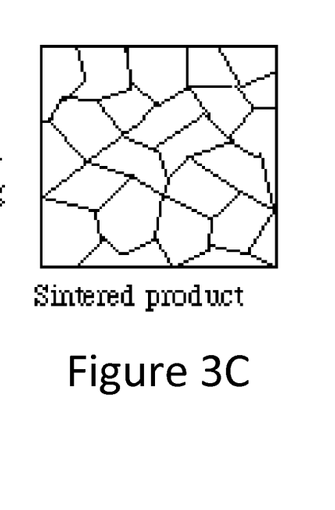

FIGS. 3A-3C illustrate the steps of forming a sintered product from a raw material, according to an illustrative implementation. In general, sintering can refer to a process for forming a solid mass from a raw material containing discreet particles, such as a powder, without melting the raw material. First, a raw powder can include loosely packed particles of raw material, as shown in FIG. 3A. The raw powder can be compacted, for example by applying vibration or external pressure to the raw material, to create a formed product, as shown in FIG. 3B. Finally, the formed product can be sintered, for example, by directing a focused source of energy at the particles of the formed product, as shown in FIG. 3C. Sintering can proceed from various mass-transport mechanisms, which can be divided into surface transport mechanisms and bulk transport mechanisms.

In surface transport mechanisms, atoms of the raw material move from the surface of one particle to the surface of another particle. In bulk transport mechanisms, atoms move from the particle interior to the surface. Surface transport mechanisms can lead to neck growth without shrinkage or densification, while bulk transport mechanisms can result in net particle movement, leading to shrinkage and densification (i.e., an increase in packing density of the particles). Surface transport mechanisms can include surface diffusion and vapor transport. Bulk transport mechanisms can include lattice diffusion, grain boundary diffusion, and viscous flow. In powders composed of different materials, chemical reactions may also provide additional mass-transport mechanisms. Such chemical reactions are sometimes referred to as reactive sintering.

Different mass-transport mechanisms can dominate at different points in the sintering process, and different raw materials can exhibit different mechanisms. For instance, a process called viscous flow is diffusion in the liquid phase, while a process called evaporation condensation, or vapor diffusion, can occur in the gaseous phase. Evaporation condensation and surface diffusion are referred to as non-densifying mechanisms, because they do not contribute to pore shrinkage. They only increase the cohesion of grains by the increase of the grain contacts. Other mass-transport mechanisms can contribute to the decrease of the volume fraction of pores (i.e., the shrinkage).

The raw material used for sintering can be referred to as compaction powder or green compact. Compaction powder can have a large surface area relative to its volume. This surface area can provide the driving force in sintering, which is the reduction of free surface energy resulting from the high surface area of the particles. The driving force of the sintering process is the reduction of overall free energy by the decrease of specific surface area and compact interfaces. Solid state sintering may be performed by two alternative processes. First, solid state sintering can be performed by reduction of the total surface area by an increase in the average size of the particles, which leads to coarsening. Second, solid state sintering can be performed by the process of grain growth, which leads to densification. These two mechanisms can be in competition with one another. Therefore, if the atomic processes that lead to densification dominate, pores can become smaller and may disappear with time, however if the atomic processes that lead to coarsening are faster, both the pores and grains coarsen and may become larger with time.

Figure 4:
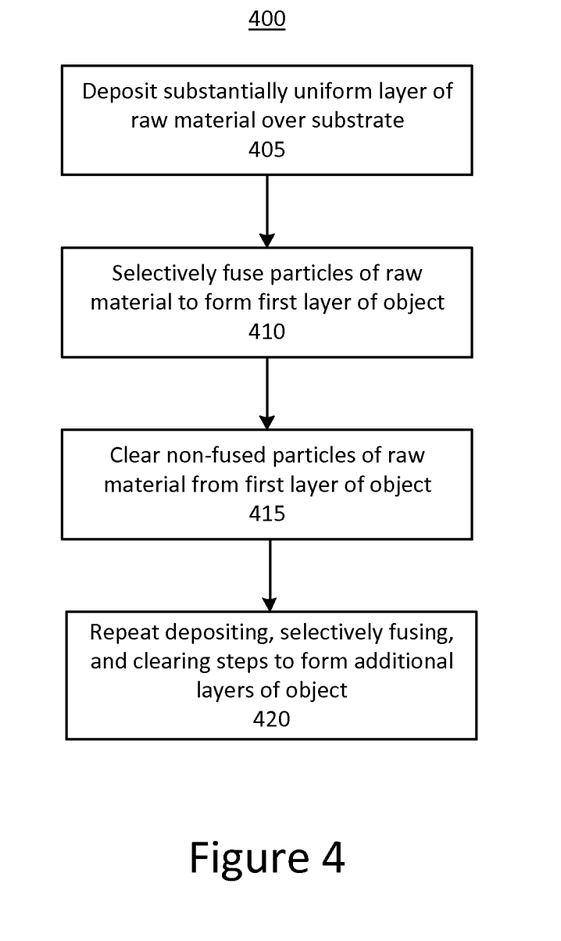
FIG. 4 provides a flowchart illustrating a first example additive manufacturing process, according to an illustrative implementation.

FIG. 4 provides a flowchart illustrating a first example additive manufacturing process 400, according to an illustrative implementation. In brief overview, the process 400 includes depositing a substantially uniform layer of raw material onto a substrate (stage 405). Particles of the raw material can be selectively fused to form a first layer of an object (stage 410). Non-fused particles of the raw material can be cleared from the first layer of the object (stage 415). The steps of depositing a substantially uniform layer of raw material, selectively fusing particles of the raw material, and clearing non-fused particles of raw material can then be repeated to form additional layers of the object above the first layer (stage 420).

Referring again to FIG. 4, and in greater detail, the process 400 includes depositing a substantially uniform layer of raw material onto a substrate (stage 405). The layer of raw material can include ceramic particles having a substantially uniform particle size. As discussed above, the mass transport mechanisms associated with sintering processes can be more effective for particles having a uniform size. Therefore, in some implementations, sintering of the raw material may be accomplished more easily due to the uniform size distribution of particles of the raw material. In some implementations, the raw material can be produced by introducing functional materials into the cavitation apparatus described above in connection with FIGS. 1 and 2 in order to produce a raw material having substantially no agglomeration of particles. Thus, in some implementations, the size of the particles in the raw material can be approximately the same as the primary particle size, because agglomeration can be substantially eliminated.

In some implementations, the raw material also may include metals, alloys, and polymers, in addition to ceramic particles. Non-limiting examples of materials that may be included in the raw material include aluminum magnesium boride, aluminum oxynitride, barium strontium cobalt ferrite, barium titanate, beryllium oxide, bismuth strontium calcium copper oxide, bone china, boron nitride, briquetage, calcium aluminates, cenosphere, ceramic colorants, ceramic flux, ceramic foam, ceramic matrix composite, cerium hexaboride, coade stone, crittersol, dysprosium titanate, earthenware, electroceramics, expanded clay aggregate, ferroelectric ceramics, fire clay, frit, fumed silica, geopolymer, geopolymer concrete, germanium dioxide, glass-ceramic, grog (clay), hafnium diboride, hydroxyapatite, jesmonite, kaolin/kaolinite, lanthanum gallium silicate, lanthanum hexaboride, lanthanum strontium cobalt ferrite, lanthanum strontium manganite, lead scandium tantalate, lead zirconate titanate, lumicera, magnesium diboride, magnesium oxide, martensite, nile silt, max phases, metal clay, molybdenum disilicide, mud, porcelain, paper clay, quartz, sea pottery, sialon, silica fume, silicon boride, silicon carbide, silicon dioxide, silicon nitride, silicon oxynitride, soapstone, strontium titanate, tetragonal polycrystalline zirconia, titanium carbide, tube-based nanostructures, tungsten disilicide, tungsten nitride, ultra-high-temperature ceramics, vitreous china, yttrium barium copper oxide, zinc oxide, zirconia toughened alumina, zirconium dioxide, AlN, Si3N4, SiC, WC, Al2O3, ZrO2 (Y, Mg, etc. stabilized), MgO, SiO2, glasses, ZnO, TiO2, PbO, PbTiO3, PbZrO3, BaTiO3, BiTiO3, SrTiO3, MgTiO3, CaTiO3, solid solutions of ceramics, CeO (Gd, Sm, etc. stabilized), Y2O3, BeO, ceramic colorants, bismuth strontium calcium copper oxide, titanium chromium, manganese, iron, cobalt, nickel, copper, zinc, molybdenum, ruthenium, rhodium, palladium, silver, tantalum, tungsten, rhenium, osmium, iridium, platinum, gold, aluminum, gallium, indium, tin, lead, bismuth, germanium, arsenic, antimony, and astatine.

In some implementations, the ceramic particles may be in powder form. Ceramic powders can be combined with other materials to form the raw material used in the process 400. For example, ceramic powder can be coated with liquids, which may improve the green strength of the raw material through surface tension. In some other implementations, ceramic powders can be coated with polymers to form the raw material. Polymer-coated powder can also improve green strength of the raw material, because the polymer may serve as a tether between particles of the raw material. In some implementations, the raw material can include ceramic particles having a first average size, which may be mixed with particles of another material having a smaller average size than the average size of the ceramic particles, in order to fill the interstices between the ceramic particles. In some implementations, particle size of the raw material can be selected to increase, or maximize, the green bulk density of the raw material.

In some implementations, the raw material can include one or more sintering aids. A sintering aid can be any material positioned in between the particles of the raw material to enhance diffusion. In some implementations, a sintering aid can be selected to promote liquid phase sintering. Such techniques may be particularly useful for use in raw materials having ceramics that are difficult to sinter. In some other implementations, a sintering inhibitor can be added to the raw material. For example, a sintering inhibitor can include any material that tends to prevent diffusion and contact between particles of other materials in the raw material.

In some implementations, the raw material can include particles of a fugitive material. Fugitive materials can be materials that will break down during the sintering process, thereby resulting in gaps in the microstructure of the finished three-dimensional object. In some implementations, fugitive materials can be selected to achieve a desired degree of porosity in the finished object. In some implementations, fugitive materials can include carbon based compounds that will break down through pyrolysis, hydrogenation, oxidation, gasification, vaporization or any combination of these processes. Polymers also may be used as fugitive materials. For example, fugitive materials such as polyethylene (PE), polysaccharides (rice starches, celluoses, gums, etc.), acrylics (PMMA, PBMA, etc.), vinyls (PVB, PVA, PVAc), polycarbonates, PVP, polyamides, polyimides, may be included in the raw material. Particulate systems including carbon black, graphite, graphene, and nanotubes, can combined with these polymers to form these cavities or channels within the structure of the finished object.

In some implementations, the raw material can include one or more solvents. For example, solvents may include acetic acid, acetone, acetonitrile, benzene, butanol, butyl acetate, carbon tetrachloride, chlorobenzene, chloroform, cyclohexane, 1,2-dichloroethane diethyl ether, diethylene glycol, diglyme (diethylene glycol dimethyl ether), 1,2-dimethoxy-ethane (glyme, DME), dimethylether dimethylformamide (DMF), dimethyl sulfoxide (DMSO), dioxane, ethanol, ethyl acetate, ethylene glycol, gamma butyrl lactone (GBL), glycerin, heptane, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane, Petroleum ether, propanol, propylene carbonate, pyridine, terpineol, tetrahydrofuran (THF), texanol, toluene, triethyl amine, water, and xylene.

In some implementations, the raw material also can include one or more surfactants. For example, surfactants can include anionic types (e.g., carboxylates, phosphate esters, sulfonates, petroleum sulfonates, alkylbenzenesulfonates, naphthalenesulfonates, olefin sulphonates, alkyl sulfates, sulfates, sulfated natural oils & fats, sulfated esters, sulfated alkanolamides, alkylphenols, ethoxylated and sulfated, etc.), nonionic types (e.g., ethoxylated aliphatic alcohol, polyoxyethylene surfactants, carboxylic esters, polyethylene glycol esters, anhydrosorbitol ester and ethoxylated derivatives, glycol esters of fatty acids, carboxylic amides, monoalkanolamine condensates, polyoxyethylene fatty acid amides, etc.), cationic type (e.g., quaternary ammonium salts, amines with amide linkages, polyoxyethylene alkyl & alicyclic amines, n,n,n',n' tetrakis substituted ethylenediamines, 2-alkyl 1-hydroxethyl 2-imidazolines, etc.), and amphoteric type (e.g., n-coco 3-aminopropionic acid/sodium salt, n-tallow 3-iminodipropionate, disodium salt, n-carboxymethyl n dimethyl n-9 octadecenyl ammonium hydroxide, n-cocoamidethyl n hydroxyethylglycine, sodium salt, etc.).

In some implementations, the after the raw material is deposited onto the substrate, the deposited layer of raw material can be compacted to increase the density of the deposited layer. In some implementations, vibration or pressure can be used to promote compaction of the deposited layer. For example, the deposited layer of raw material can be subjected to external pulsed vibration or external pressure to increase its density and uniformity of thickness.

The process 400 includes selectively fusing particles of the raw material to form a first layer of the object (stage 410). In some implementations, the particles can be selectively fused using a sintering process. As discussed above, sintering can be accomplished using a directed source of energy applied to the selected areas of the layer of raw material to promote fusion of the particles of the raw material. In some implementations, the focused energy can be rastered across the layer of raw material in a pattern corresponding to a desired shape of the three-dimensional object. Energy can be applied to the layer of raw material, for example, using a stylus, a beam, or a heated platen.

In some implementations, sintering can be accomplished by applying localized heat or localized pressure to the areas of the layer of raw material that are intended to be sintered. For example, both heat and pressure can be applied using one or more heated platens. In some implementations, the heated platen can be patterned or shaped according to the desired shape of the object being formed. Thus, the platen can be pressed directly onto the layer of raw material, and the shape of the heated platen can serve as a mask in areas where sintering is not desired, while facilitating transfer of heat and pressure where sintering is desired. The temperature of the platen and the pressure exerted by the platen on the layer of raw material can be selected to achieve a desired degree of sintering of the raw material.

In some implementations, light energy can be used to selectively fuse the particles of raw material. For example, the raw material can include at least one photosensitive material, and light energy can be used to cure the photosensitive material in areas where particle fusion is desired. In some implementations, the light energy can be infrared (IR) radiation. IR radiation can be applied directly to the surface of the layer of raw material by an emitter. The raw material can absorb at least some of the IR radiation, and the temperature of the raw material can increase as a result. The increased temperature can cause fusion of the particles of raw material. In some implementations, the wavelength of the IR radiation can be selected based on thickness of the layer of raw material. For example, shorter wavelength IR radiation may be able to penetrate into a thicker layer of raw material than longer wavelength IR radiation.

In some implementations, microwave heating can be used to selectively fuse particles of the raw material. For example, microwave heating can rapidly increase the temperature of the raw material. The heat can be generated internally within the layer of raw material and then be transmitted outwards towards the surfaces of the raw material, thereby resulting in an inverse heating profile. The rapid heating rate that can be achieved with microwave heating can minimize the impurity phases that can be produced at low temperatures, which typically inhibit sintering.

In some implementations, an external electric field or magnetic field can be used to selectively fuse particles of the raw material. Electric fields or electric current can be applied using an electron beam or an electrified stylus that is pressed against the surface of the layer of raw material. For example, the stylus can be an electrified wheel or a mounted sphere configured to roll across a surface of the layer of raw material. Other forms of sintering also may be used to form the first layer of the object. For example, spark plasma sintering (SPS) or laser shock peening (LSP) can be used to fuse particles of the raw material. As discussed above, liquid phase sintering also can be used to fuse particles of the raw material in implementations in which the raw material includes a liquid phase sintering aid.

The process 400 includes clearing non-fused particles of the raw material from the first layer of the object (stage 415). In some implementations, any suitable means for removing non-fused particles can be used. For example, non-fused particles can be brushed off of the first layer of the object by a doctor blade or a squeegee. In some other implementations, jetted air or vibration can be used to remove non-fused particles from the first layer of the object.

The process 400 also includes repeating the steps of depositing the raw material, selectively fusing particles of the raw material, and clearing non-fused particles of the raw material to form additional layers of the object above the first layer (stage 420). For example, a new layer of raw material can be deposited over the first layer of the object. The new layer of raw material also can have properties similar to the first layer of raw material deposited in stage 405. For example, the new layer of raw material may include ceramic particles having a substantially uniform size. In some implementations, the new layer of raw material may be different from the first layer of raw material. For example, the new layer of raw material may include different material to achieve different mechanical or electrical properties. Particles of the new layer of raw material can be selectively fused using any of the techniques described above, and the non-fused particles can be cleared from the new layer of the object. These steps can be repeated any number of times, until the three-dimensional object is complete. While no post-processing may be required, in some implementations, the three-dimensional object can be post processed to promote additional sintering and densification of the object.

Figure 5:
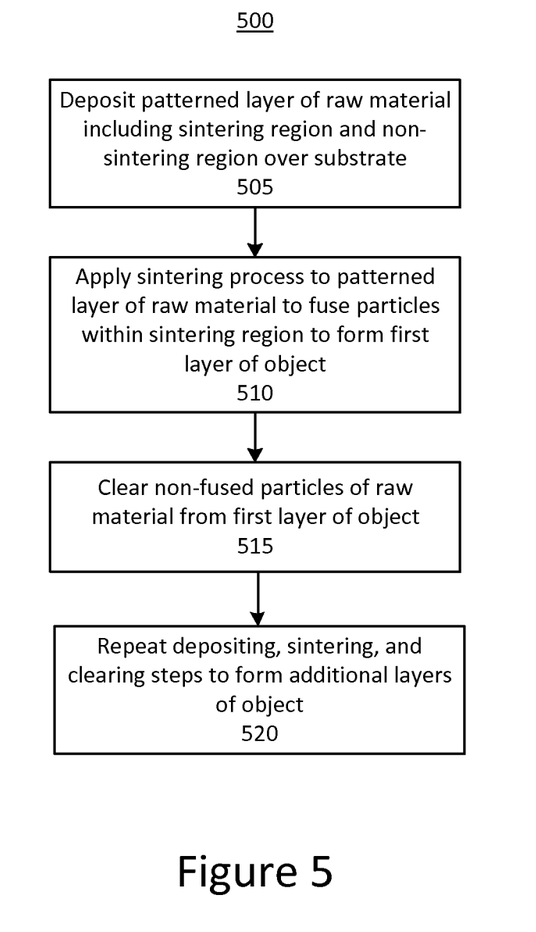
FIG. 5 provides a flowchart illustrating a second example additive manufacturing process, according to an illustrative implementation.

FIG. 5 provides a flowchart illustrating a second example additive manufacturing process 500, according to an illustrative implementation. In brief overview, the process 500 includes depositing a patterned layer of raw material including a sintering region and a non-sintering region onto a substrate (stage 505). Particles of the raw material within the sintering region can be fused by the application of a sintering process to form a first layer of an object (stage 510). Non-fused particles of the raw material can be cleared from the first layer of the object (stage 515). The steps of depositing a patterned layer of raw material, applying a sintering process to the raw material, and clearing non-fused particles of raw material can then be repeated to form additional layers of the object above the first layer (stage 520).

Referring again to FIG. 5, and in greater detail, the process 500 includes depositing a patterned layer of raw material including a sintering region and a non-sintering region onto a substrate (stage 505). The pattern can correspond to a shape of a first layer of the object. The raw material can include ceramic particles having a substantially uniform size within the sintering region. In some implementations, the size distribution of the ceramic particles in the non-sintering region may be uniform, but this may not be necessary in all implementations.

Figure 6:
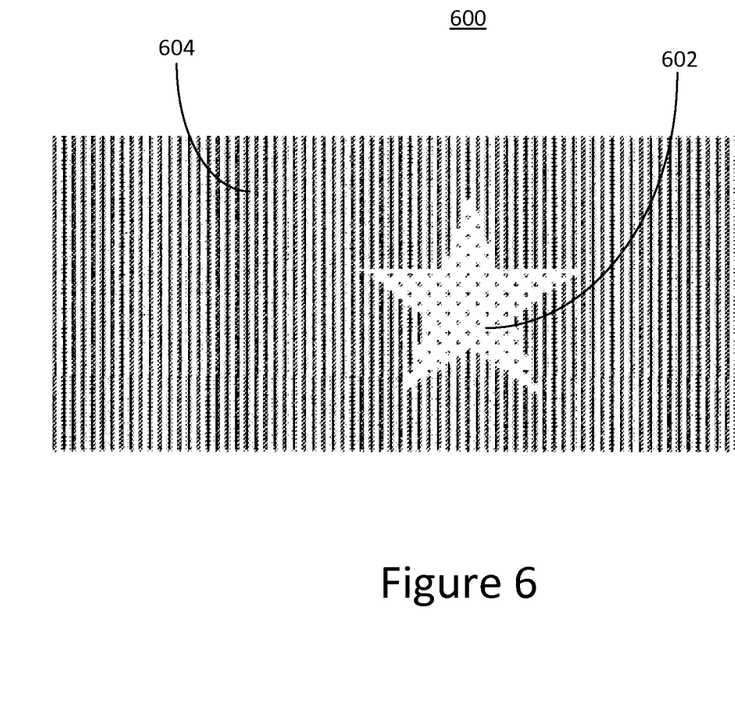
FIG. 6 provides a top view of a patterned layer of raw material suitable for use in the additive manufacturing process shown in FIG. 5, according to an illustrative implementation.

The process 500 differs from the process 400 shown in FIG. 4 in that the deposited layer of raw material is patterned to define a sintering region and a non-sintering region in the process 500. FIG. 6 provides a top view of a patterned layer 600 of raw material suitable for use in the additive manufacturing process 500 shown in FIG. 5, according to an illustrative implementation. As shown, the layer 600 is generally rectangular in shape. A sintering region 602 is defined in the middle of the layer 600. The sintering region 602 includes particles that will experience a relatively high degree of fusion when subjected to a sintering process. The sintering region 602 is surrounded by a non-sintering region 604. The non-sintering region 604 includes particles that will experience a relatively low degree of fusion (or no fusion at all) when subject to the sintering process. As a result of the pattern defined by the sintering region 602 and the non-sintering region 604, the entire layer 600 may be subjected to a uniform sintering process without the need for selectively applying the sintering process to desired areas of the layer of deposited material, as is done in the process 400 shown in FIG. 4. Thus, the sintering process used in the process 500 can be simpler than the sintering process used in the process 400.

Several techniques are available for defining the sintering region 602 and the non-sintering region 604. For example, as discussed above, particle size of a raw material can be adjusted to achieve a desired to degree of sintering. In particular, smaller particles typically fuse more readily than larger particles. Therefore, in some implementations, the sintering region 602 and the non-sintering region 604 can be defined by depositing a raw material having a first average particle size in the sintering region 602, and depositing a raw material having a second average particle size, larger than the first average particle size, in the non-sintering region 604. Similarly, in some implementations, the sintering region 602 and the non-sintering region 604 can be defined by depositing a raw material having more densely packed particles in the sintering region 602, and depositing a raw material having less densely packed particles in the non-sintering region 604. Because sintering is not desired in the non-sintering region 604, the particle size distribution in the non-sintering region is not of great concern. Thus, the particles in the non-sintering region may include agglomerates that are significantly larger than the primary particle size.

In some implementations, the sintering region 602 and the non-sintering region 604 can be defined by depositing a raw material having a sintering aid in the sintering region 602, and depositing a raw material having that either lacks the sintering aid or includes a sintering inhibitor in the non-sintering region 604. As discussed above, sintering aids generally promote diffusion, while sintering inhibitors generally prevent diffusion. By depositing the layer of raw material 600 to include a sintering aid in the sintering region 602 but not in the non-sintering region 604, fusion of particles can be achieved only in the sintering region when the entire layer is subjected to a sintering process.

In some implementations, the materials included within the sintering region 602 and the non-sintering region 604 an be selected based on the sintering technique to be applied. For example, in implementations in which the sintering technique relies on light energy, the sintering region 602 can be defined by including a photosensitive material that is not included in the non-sintering region 604. In implementations in which the sintering mechanism relies on electrical energy, the sintering region 602 can be defined by including a highly conductive material that is not included in the non-sintering region 604.

Referring again to FIG. 5, the process 500 includes applying a sintering process to the layer of raw material to fuse particles of the raw material within the sintering region to form the first layer of the object (step 510). The sintering process can include any of the sintering processes discussed above in connection with FIG. 4. However, in the process 500, there is no need for the sintering process to be selectively applied to the layer of raw material. For example, because particles of the layer of raw material will only experience a high degree of fusion in the sintering region, and because the sintering region is patterned in the desired shape of the object to be formed, the entire layer can be subjected to a uniform sintering process. For example, the entire layer can be subjected to temperature or heat using a heated platen that covers the entire layer of raw material. The platen need not be patterned as it was in the process 400, because the pattern is already defined in the sintering region according to the desired shape of the object to be formed. Similarly, the entire layer of raw material can be subjected to light radiation, electric fields, or magnetic fields to promote fusion of particles within the sintering region.

The process 500 includes clearing non-fused particles of the raw material from the first layer of the object (stage 515). In some implementations, any suitable means for removing non-fused particles can be used. For example, non-fused particles can be brushed off of the first layer of the object by a doctor blade or a squeegee. In some other implementations, jetted air or vibration can be used to remove non-fused particles from the first layer of the object.

The process 500 also includes repeating the steps of depositing a patterned layer of raw material, applying a sintering process to the raw material, and clearing non-fused particles of the raw material to form additional layers of the object above the first layer (stage 520). For example, a new layer of raw material can be deposited over the first layer of the object. The new layer of raw material can also be patterned to define a sintering region and a non-sintering region corresponding to the desired shape of the object to be formed. Particles of the new layer of raw material within the sintering region can be fused by applying any of the sintering techniques described above, and the non-fused particles within the non-sintering region can be cleared from the new layer of the object. These steps can be repeated any number of times, until the three-dimensional object is complete. While no post-processing may be required, in some implementations, the three-dimensional object can be post processed to promote additional sintering and densification of the object.

Figure 7:
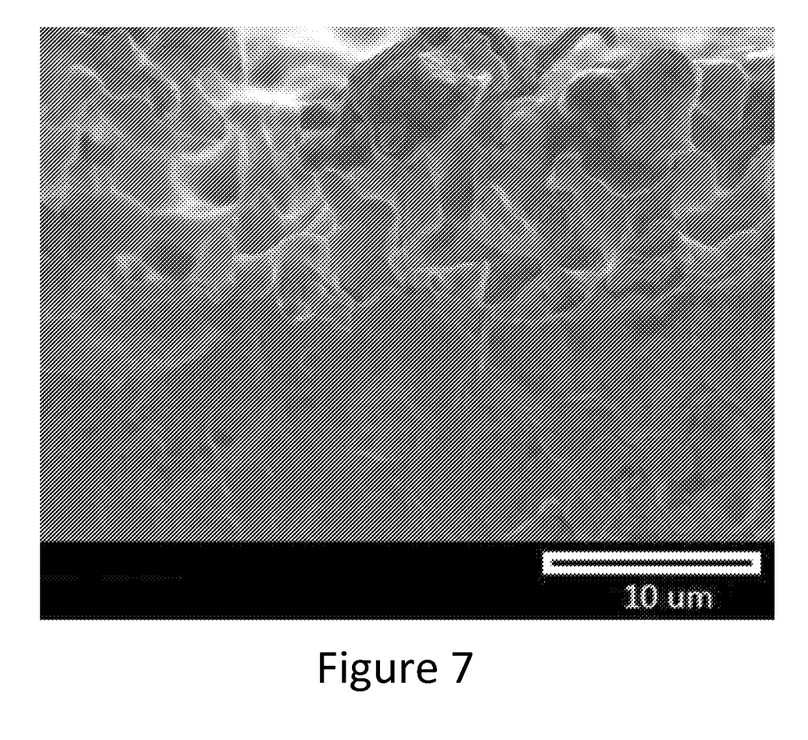
FIG. 7 provides a microscopy image of a cross section showing platinum co-fired on zirconia, according to an illustrative implementation.

FIG. 7 provides a microscopy image of a cross section showing platinum co-fired on zirconia, according to an illustrative implementation. In some implementations, the sample shown in the cross section of FIG. 7 can be included within a catalytic sensor. The upper layer of the sample shown in FIG. 7 is formed from platinum, while the lower layer is formed from zirconia. In this example, the upper platinum layer was screen printed onto the lower zirconia layer, and the sample was heated in a furnace at about 1375 degrees Celsius to promote sintering. In some implementations, the platinum layer of the sample shown in FIG. 7 can be used as a conductive electrode layer or as part of a heater in a catalytic sensor, while the zirconia layer can serve as an insulating layer.

Figure 8:
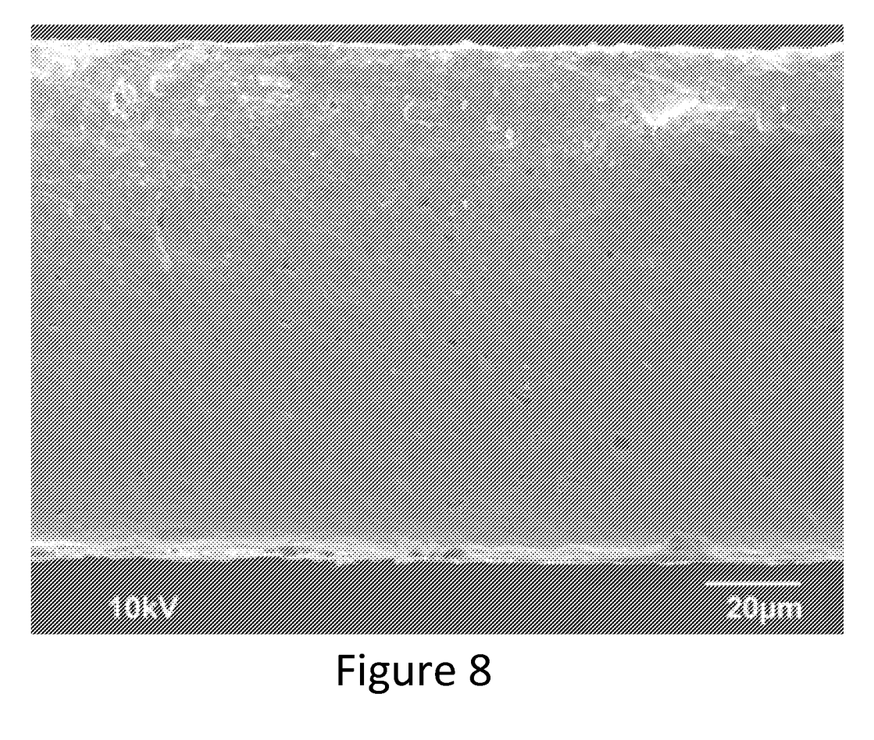
FIG. 8 provides a microscopy image of a cross section showing nano alumina, according to an illustrative implementation.

FIG. 8 provides a microscopy image of a cross section showing nano alumina, according to an illustrative implementation. Samples of nano alumina such as that shown in FIG. 8 can be useful in a variety of applications. For example, the additive manufacturing techniques described in this disclosure can be used to form devices having one or more layers of nano alumina, including seal rings, medical prostheses, laser tubes, electronic substrates, ballistic armour, thermocouple tubes, electrical insulators, grinding media, threadguides, and wear components.

Applications

The methods and systems described herein may be employed in a variety of applications. For example, systems and methods may be used to form multilayer electronic devices using the additive manufacturing techniques described above. In one implementation, a process similar to the process 500 shown in FIG. 5 can be used to build various layers of an electronic device. For example, a first layer of raw material having electrically conductive properties can be patterned to define a sintering region corresponding to conductive traces of the electronic device. The first layer of material can be subjected to a sintering process to fuse the particles within the sintering region and the non-fused particles remaining in the non-sintering region can be cleared away. A raw material having insulating properties can then be deposited and patterned to define a sintering region between the conductive traces formed previously. The layer of insulating material can then be subjected to a sintering process to fuse particles within the sintering region, and the non-fused particles can be cleared away. Subsequent layers of the electronic device can be formed in a similar fashion. Alternatively, a process similar to the process 400 shown in FIG. 4 can be used to build such a device by selectively fusing conductive and insulating raw materials, rather than be fusing patterned layers of the raw materials.

Devices fabricated according to these techniques can be useful in Scaffolds for tissue engineering, time released drugs, prosthetics, dental devices, firearms/projectiles, sensors, communication devices, microprocessors, engines/turbines, structural elements for automobiles and spacecraft, foods/pastries, children's toys, clothing, musical instruments, drones, etc.

Additional Notes

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various implementations and examples, it is not intended that the present teachings be limited to such implementations or examples. On the contrary, the present teachings encompass various alternatives, modifications, and equivalents, as will be appreciated by those of skill in the art.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described implementations of the invention may be implemented in any of numerous ways. For example, some implementations may be implemented using hardware, software or a combination thereof. When any aspect of an implementation is implemented at least in part in software, the software code may be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various implementations of the technology discussed above. The computer readable medium or media may be transportable, such that the program or programs stored thereon may be loaded onto one or more different computers or other processors to implement various aspects of the present technology as discussed above.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed:

1. A method of manufacturing a three-dimensional object from a raw material including ceramic particles without requiring post process sintering, the method comprising:
   providing the raw material including the ceramic particles;
   forcing the raw material through an orifice of a hydrodynamic cavitation chamber using an air-driven piston;
   subjecting the raw material to a hydrodynamic cavitation process to de-agglomerate the ceramic particles such that the ceramic particles have a substantially uniform size;
   depositing a substantially uniform layer of the raw material onto a substrate, wherein the raw material comprises the ceramic particles having the substantially uniform size;
   selectively fusing particles of the raw material to form a first layer of the object;
   clearing non-fused particles of the raw material from the first layer of the object; and
   repeating the steps of depositing the raw material, selectively fusing particles of the raw material, and clearing non-fused particles of the raw material to form additional layers of the object above the first layer.

2. The method of claim 1, wherein substantially no agglomeration of the particles can be observed in the raw material after the step of subjecting the raw material to the hydrodynamic cavitation process.

3. The method of claim 1, further comprising compacting the particles of the raw material using at least one of vibration and external pressure prior to selectively fusing the particles of the raw material.

4. The method of claim 1, wherein the raw material comprises ceramic particles coated with at least one of a metal and a polymer.

5. The method of claim 1, wherein the raw material comprises at least one of a sintering aid, a sintering inhibitor, and a fugitive material selected to result in a predetermined microstructure of the object.

6. The method of claim 1, wherein the step of selectively fusing particles of the raw material further comprises applying at least one of localized heat and localized pressure to the particles of the raw material.

7. The method of claim 1, wherein the step of selectively fusing particles of the raw material further comprises selectively applying an electric field or a magnetic field to the particles of the raw material.

8. The method of claim 1, wherein:
   the raw material further comprises photosensitive particles; and
   the step of selectively fusing particles of the raw material further comprises selectively applying light energy to the particles of the raw material.

9. The method of claim 1, wherein the method does not include post processing of the three-dimensional object.

10. The method of claim 1, wherein the raw material further comprises at least one surfactant.

11. The method of claim 1, wherein the raw material further comprises at least one solvent.

* * * * *